United States Patent
Kim et al.

(10) Patent No.: US 7,522,340 B2
(45) Date of Patent: Apr. 21, 2009

(54) HIGHLY EFFICIENT 2D/3D SWITCHABLE DISPLAY APPARATUS

(75) Inventors: Dae-sik Kim, Suwon-si (KR); Serguei Chestak, Suwon-si (KR); Kyung-hoon Cha, Yongin-si (KR); Jae-phil Koo, Seoul (KR); Seon-deok Hwang, Jochiwon-eup (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/876,177

(22) Filed: Oct. 22, 2007

(65) Prior Publication Data

US 2008/0174848 A1 Jul. 24, 2008

(30) Foreign Application Priority Data

Jan. 24, 2007 (KR) .................... 10-2007-0007651

(51) Int. Cl.
*G02B 5/30* (2006.01)
*G02B 27/26* (2006.01)
(52) U.S. Cl. ...................... 359/494; 359/465
(58) Field of Classification Search ............... 359/462, 359/465, 483, 485, 487, 493, 494; 362/19; 349/62, 96
See application file for complete search history.

(56) References Cited

U.S. PATENT DOCUMENTS 6,515,785 B1 * 2/2003 Cobb et al. ................. 359/247
6,804,058 B1 * 10/2004 Ouderkirk et al. ........... 359/494

FOREIGN PATENT DOCUMENTS

| EP | 1655634 A1 | 5/2006 |
|----|-----------|--------|
| EP | 1711022 A2 | 10/2006 |
| EP | 1742492 A2 | 1/2007 |

* cited by examiner

*Primary Examiner*—William C. Choi
*Assistant Examiner*—Jack Dinh
(74) *Attorney, Agent, or Firm*—Sughrue Mion, PLLC (57) ABSTRACT

An image display apparatus includes a backlight unit where a reflection panel is installed at a bottom thereof, a polarization panel which transmits only light of a particular polarization direction of light emitted from the backlight unit, a polarization switch which changes the polarization direction of incident light, a birefringent element array which is formed by alternately arranging a plurality of first and second birefringent elements and changes the polarization direction of incident light to make the polarization directions of light passing through the first and second birefringent elements perpendicular to each other, a reflective polarizer panel which transmits only light of a particular polarization direction of the light passing through the birefringent element array and reflects light of the other polarization direction, a lens array which separates incident light into a first view zone and a second view zone, and a display panel which displays an image.

21 Claims, 6 Drawing Sheets

HIGHLY EFFICIENT 2D/3D SWITCHABLE DISPLAY APPARATUS

CROSS-REFERENCE TO RELATED PATENT APPLICATIONS

This application claims the priority from Korean Patent Application No. 10-2007-0007651, filed on Jan. 24, 2007, in the Korean Intellectual Property Office, the disclosure of which is incorporated herein in its entirety by reference.

BACKGROUND OF THE INVENTION

1. Field of the Invention

The present invention relates to a 2D/3D switchable display apparatus, and more particularly, to a highly efficient 2D/3D switchable display apparatus having improved brightness by enhancing a light use efficiency.

2. Description of the Related Art

A stereo image display providing a stereo image is greatly needed in a variety of fields such as medical images, games, advertisements, education, and military affairs. Also, as high resolution TVs are becoming popular, stereo TVs that can display stereo images are expected to be popular in the future.

In general, a stereo image display apparatus provides an image for the left eye and an image for the right eye having a binocular parallax respectively to the left eye and the right eye of a user. The user recognizes the left eye image and the right eye image provided by the stereo image display apparatus through the retinas of both eyes so as to view a 3D stereo image. The stereo image display apparatus includes a parallax barrier type and a lenticular type.

Figure 1:
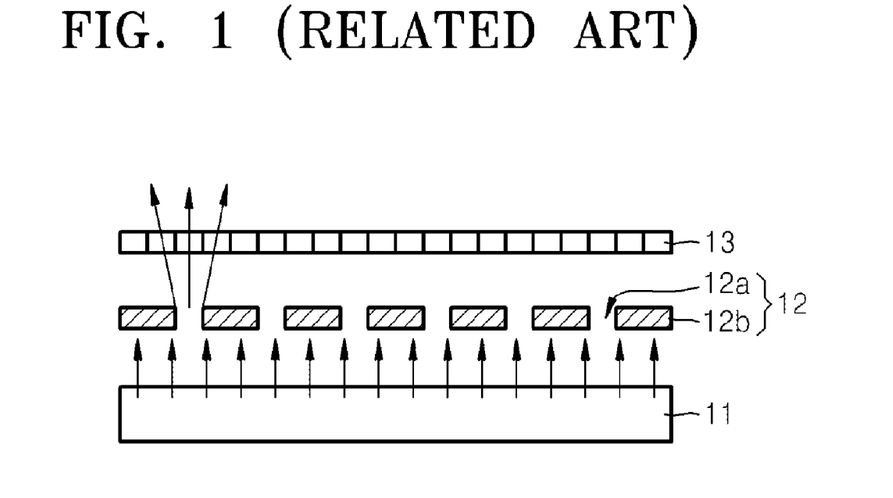
FIG. 1 schematically illustrates the structure of a general stereo image display apparatus of a parallax barrier type.

According to the parallax barrier type, image to be seen by the left and right eyes are alternately displayed in a vertical pattern and then the images are viewed using thin vertical strips, that is, a barrier. For example, as shown in FIG. 1, a stereo image display apparatus of the parallax barrier type includes a backlight unit 11, an LCD panel 13, and a parallax barrier 12 having an opening 12a and a barrier 12b which are arranged at a predetermined period. Although in FIG. 1 the parallax barrier 12 is arranged between the LCD panel 13 and the backlight unit 11, the parallax barrier 12 can be arranged in front of the LCD panel 13. In this structure, the images for the left and right eyes alternately displayed by the LCD panel 13 can be separated by the opening 12a of the parallax barrier 12.

However, in the above-described parallax barrier type stereo image display apparatus, since part of the light provided by the backlight unit 11 is blocked by the barrier 12b, a light use efficiency is low and brightness is decreased. Furthermore, for the stereo image display apparatus, since the left eye image and the right eye image are simultaneously displayed from the LCD panel 13, the resolution of a stereo image that is viewed by the user is reduced to ½ of the original resolution of the LCD panel 13. When a multi-viewpoint stereo image, for example, a three viewpoint or more stereo image, is provided, the resolution is reduced as much.

Also, to provide a 2D image or 3D image according to an image signal to be displayed, a stereo image display needs a switching operation between a 2D image mode and a 3D image mode.

Figure 2:
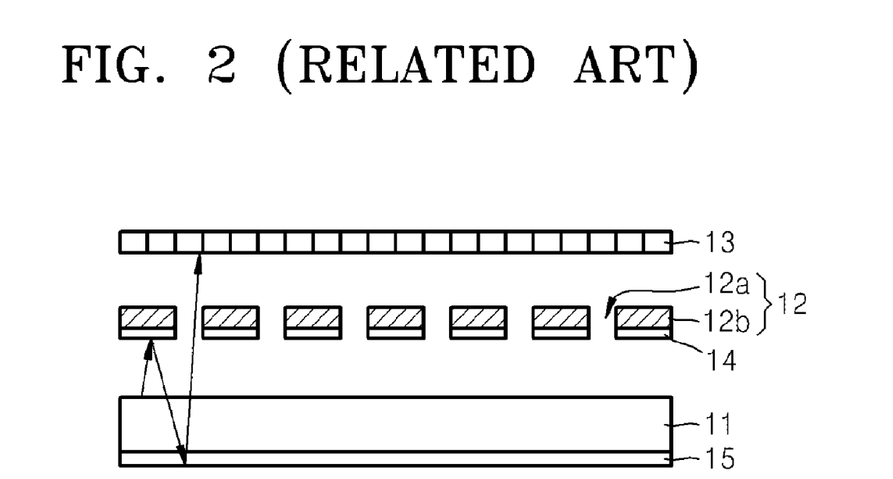
FIG. 2 schematically illustrates an exemplary structure of the stereo image display apparatus of a parallax barrier type to improve a light use efficiency.

To prevent the reduction of brightness, as shown in FIG. 2, a method has been suggested in which a reflection film 14 is coated on the surface of the barrier 12b facing the backlight unit 11 and a reflection panel 15 is installed on the lower surface of the backlight unit 11. In this case, the light emitted from the backlight unit 11 and incident on the barrier 12b can be reused because the light is reflected by the reflection film 14 and then reflected again by the reflection panel 15. In this case, however, there still remains a problem that resolution is reduced and that the switching between 2D and 3D is not possible.

SUMMARY OF THE INVENTION

To solve the above and/or other problems, the present invention provides a 2D/3D switchable display apparatus which can improve brightness by enhancing a light use efficiency and realize a high resolution. However, the present invention is not required to overcome the disadvantages described above.

According to an aspect of the present invention, there is provided an image display apparatus including a backlight unit where a reflection panel is installed at a bottom thereof, a polarization panel transmitting only light of a particular polarization direction of light emitted from the backlight unit, a polarization switch changing the polarization direction of incident light, a birefringent element array formed by alternately arranging a plurality of first and second birefringent elements and changing the polarization direction of incident light to make the polarization directions of light passing through the first and second birefringent elements perpendicular to each other, a reflective polarizer transmitting only light of a particular polarization direction of the light passing through the birefringent element array and reflecting light of the other polarization direction, a lens array separating incident light into a first view zone and a second view zone, and a display panel displaying an image.

The polarization switch may be switched among first through third states in which the polarization direction of incident light is changed differently.

The polarization switch may be switched among a first state in which the polarization direction of incident light is not changed, a second state in which the polarization direction of incident light is changed by 45°, and a third state in which the polarization direction of incident light is changed by 90°.

The birefringent element array may be formed by alternately arranging in a horizontal direction the first and second birefringent elements that are vertical.

Each of the first and second birefringent elements may be formed of a retarder that delays incident light by a predetermined phase and a phase delay difference between a retarder forming the first birefringent element and a retarder forming the second birefringent element is $\lambda/2$.

Each of the first and second birefringent elements may be formed of a rotator that rotates incident light by a predetermined angle and a rotation angle difference between a rotator forming the first birefringent element and a rotator forming the second birefringent element is 90°.

The lens array may be formed by arranging a plurality of lenticular lens elements that are vertical and parallel to birefringent elements of the birefringent element array in a horizontal direction.

The reflective polarizer may be a wire-grid polarizer formed of metal wires arranged parallel to one another at a constant interval.

The polarization panel transmits only light of a particular polarization direction of the light emitted from the backlight unit and reflects light of the other polarization direction.

The polarization switch is divided into a plurality of horizontal segments that are sequentially switched in synchronism with a vertical scanning time of the display panel.

According to another aspect of the present invention, there is provided an image display apparatus including a backlight unit where a reflection panel is installed at a bottom thereof, a polarization panel transmitting only light of a particular polarization direction of light emitted from the backlight unit, a polarization switch changing the polarization direction of incident light, a reflective polarizer array formed by alternately arranging a first reflective polarizer that reflects first polarization light and transmits second polarization light and a second reflective polarizer that transmits the first polarization light and reflects the second polarization light, a birefringent element array formed by alternately arranging a plurality of first and second birefringent elements and changing the polarization direction of incident light to make the polarization directions of light passing through the first and second birefringent elements perpendicular to each other, a lens array separating incident light into a first view zone and a second view zone, and a display panel displaying an image.

The polarization switch may be switched among first through third states in which the polarization direction of incident light is changed differently.

The polarization switch may be switched among a first state in which the polarization direction of incident light is not changed, a second state in which the polarization direction of incident light is changed by 45°, and a third state in which the polarization direction of incident light is changed by 90°.

The birefringent element array may be formed by alternately arranging in a horizontal direction the first and second birefringent elements that are vertical.

Each of the first and second birefringent elements may be formed of a retarder that delays incident light by a predetermined phase and a phase delay difference between a retarder forming the first birefringent element and a retarder forming the second birefringent element is λ/2.

Each of the first and second birefringent elements may be formed of a rotator that rotates incident light by a predetermined angle and a rotation angle difference between a rotator forming the first birefringent element and a rotator forming the second birefringent element is 90°.

The lens array may be formed by arranging a plurality of lenticular lens elements that are vertical and parallel to birefringent elements of the birefringent element array in a horizontal direction.

The first and second reflective polarizers of the reflective polarizer array may be respectively arranged to face the first and second birefringent elements of the birefringent element array.

The first and second reflective polarizers may be wire-grid polarizers formed of metal wires arranged parallel to one another at a constant interval, and the metal wire of the first reflective polarizer and the metal wire of the second reflective polarizer may be arranged perpendicular to each other.

The polarization panel may transmit only light of a particular polarization direction of the light emitted from the backlight unit and reflects light of the other polarization direction.

The polarization switch may be divided into a plurality of horizontal segments that are sequentially switched in synchronism with a vertical scanning time of the display panel.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE
EXEMPLARY EMBODIMENTS OF THE
INVENTION

Figure 3A:
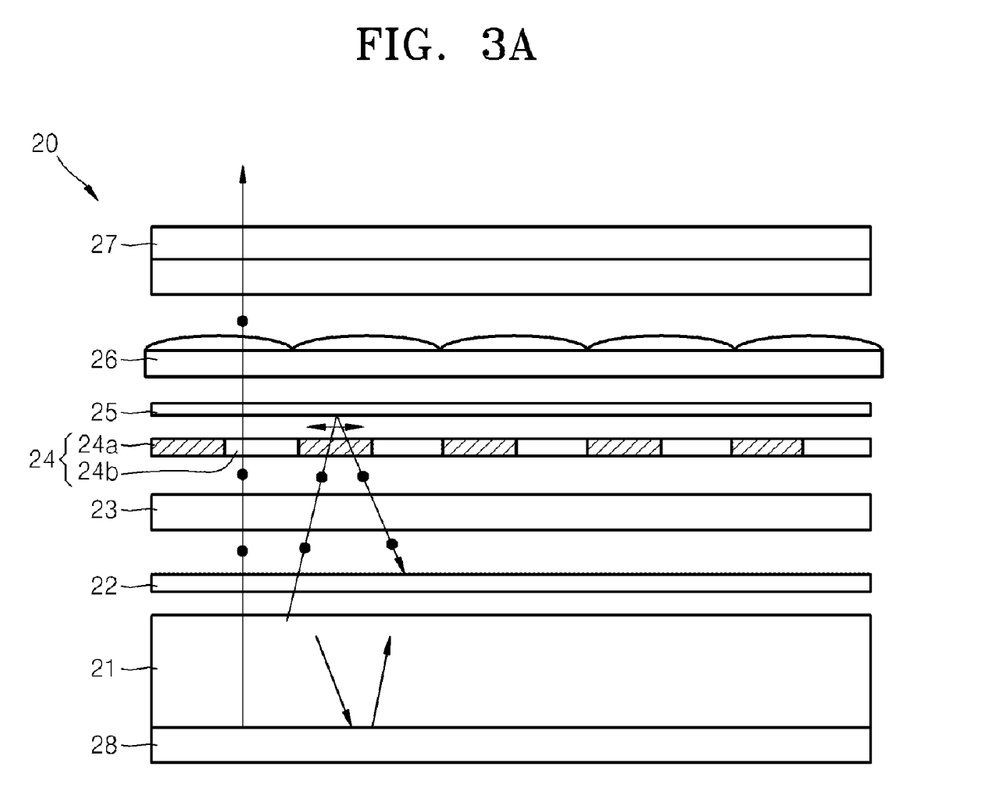
FIGS. 3A and 3B schematically illustrate the structure and operation of a stereo image display apparatus having an improved light use efficiency according to an embodiment of the present invention.
Figure 3B:
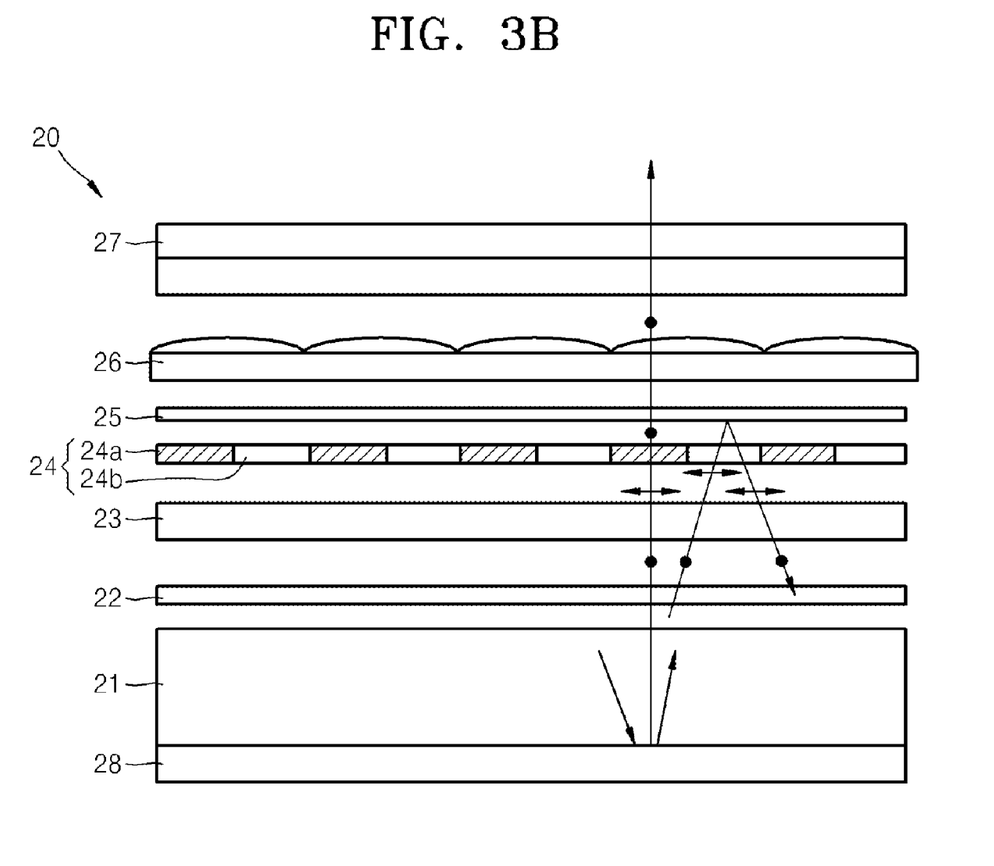

FIGS. 3A and 3B schematically illustrate the structure and operation of a stereo image display apparatus having an improved light use efficiency according to an exemplary embodiment of the present invention. Referring to FIGS. 3A and 3B, an image display apparatus 20 according to an exemplary embodiment includes a backlight unit 21 having a reflection panel 28 installed at a bottom surface thereof, a polarization panel 22 transmitting light only in a particular polarization direction of the light emitted from the backlight unit 21, a polarization switch 23 converting the polarization direction of the incident light according to electric control, a birefringent element array 24 having a plurality of first and second birefringent elements 24a and 24b converting the polarization direction of the incident light which are alternately formed, a reflective polarizer 25 transmitting only light of a particular polarization direction of the light passing through the birefringent element array 24 and reflecting light of the other polarization direction, a lens array 26 separating the incident light into a left eye view zone and a right eye view zone, and a display panel 27 displaying an image.

The polarization panel 22 may be a general absorptive polarizer that transmits light of a particular polarization direction and absorbs the other light of the light emitted from the backlight unit 21. However, to increase a light use efficiency, a reflective polarization film having a multilayer structure such as a dual brightness enhancement film (DBEF) which transmits the light of a particular polarization direction and reflects the others may be used as the polarization panel 22.

According to the present invention, the display panel 27 is a non-emissive display such as an LCD panel using the backlight unit 21 as a light source. As it will be described later, the display panel 27 according to the present invention alternately displays a right eye image and a left eye image in a 3D mode according to the passage of time. For example, the display panel 27 operates such that the right eye image is displayed at a first frame and the left eye image is displayed at a second frame. Thus, for a user to view the right eye image and the left eye image without flickering, a high response speed LCD having a refresh rate of 120 Hz or higher may be used as the display panel 27.

Also, in the present exemplary embodiment, the polarization switch 23 may switch between first through third states respectively having a difference of 45° in the polarization direction of light passing through the polarization switch 23. For example, the polarization switch 23 has a first state in which the polarization direction of the incident light is not changed, a second state in which the polarization direction of the incident light is changed by 45°, and a third state in which the polarization direction of the incident light is changed by 90°. In each state of the polarization switch 23, the change angle of the polarization direction is exemplary and the polarization switch 23 can be designed to be different according to the polarization characteristic of the polarization panel 22 and the birefringent element array 24. It is sufficient that the difference in the polarization direction of the transmission light when the polarization switch 23 is in each of the first, second, and third states has a difference of 45°. The polarization switch 23 is formed of an electrically controllable device having three anisotropic statuses according to the amount of an applied voltage. For example, a liquid crystal retarder can be used as the polarization switch 23. When the polarization switch 23 is the liquid crystal retarder, for example, the incident light is not delayed in the first state, the phase of the incident light is delayed by ¼ wavelength ($\lambda/4$) in the second state, and the phase of the incident light is delayed by ½ wavelength ($\lambda/2$) in the third state.

As shown in FIGS. 3A and 3B, the birefringent element array 24 according to the present exemplary embodiment has the first and second birefringent elements 24a and 24b which are alternately formed in the horizontal direction. Although it is not shown in FIGS. 3A and 3B, the first and second birefringent elements 24a and 24b are respectively formed in the vertical direction of the image display apparatus 20 and arranged alternately in the horizontal direction. According to the present exemplary embodiment, the birefringent element array 24 changes the polarization direction of the incident light such that the polarization directions of the light passing through the first and second birefringent elements 24a and 24b are perpendicular to each other.

For example, the first and second birefringent elements 24a and 24b can be formed of retarders that delay the incident light by a predetermined phase. In this case, the retarder forming the first birefringent element 24a and the retarder forming the second birefringent element 24b are configured to have a phase delay difference of $\lambda/2$. For example, the first birefringent element 24a does not delay phase while the second birefringent element 24b delays phase by $\lambda/2$. In another exemplary embodiment, the first birefringent 24a delays the phase by $-\lambda/4$ while the second birefringent element 24b delays phase by $+\lambda/4$. In yet another exemplary embodiment, the first and second birefringent elements 24a and 24b can be formed of rotators rotating the incident light at a predetermined angle. In this case, a rotator forming the first birefringent element 24a and a rotator forming the second birefringent element 24b are configured to have a rotation angle difference of 90. For example, the first birefringent element 24a does not rotate the incident light while the second birefringent element 24b rotates the incident light by 90°. Also, the first birefringent element 24a rotates the incident light by −45° while the second birefringent element 24b rotates the incident light by +45°.

The reflective polarizer 25 transmits only light of a particular polarization direction and reflects light of a different polarization direction of the light passing through the birefringent element array 24. In particular, when an LCD panel is used as the display panel 27, the reflective polarizer 25 transmits light of the same polarization direction as that of a rear polarizer (not shown) arranged at the rear surface of the LCD panel and reflects light of a polarization direction perpendicular to the polarization direction of the rear polarizer. However, to simplify the structure of the image display apparatus 20, the rear polarizer of the LCD panel can be replaced by the reflective polarizer 25.

Figure 4:
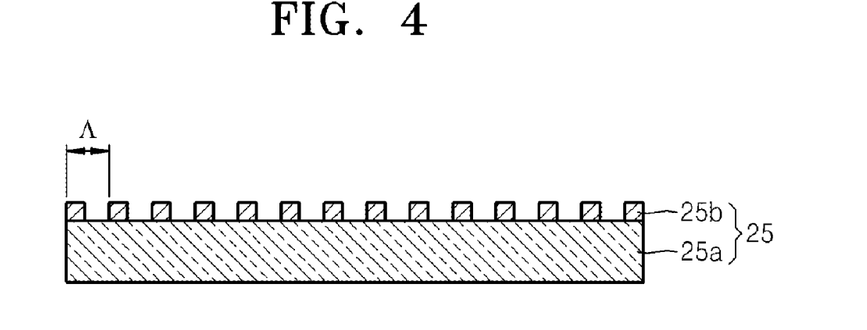
FIG. 4 schematically illustrates the cross-sectional view of a reflective polarizer used for the stereo image display apparatus of FIGS. 3A and 3B.

To provide quality polarization light to the display panel 27, the polarization extinction ratio of the reflective polarizer 25 may be very high. For this purpose, a wire-grid polarizer, for example, can be used as the reflective polarizer 25. As shown in FIG. 4, the wire-grid polarizer is formed by arranging a plurality of thin conductive metal wires 25b on a transparent substrate 25a in parallel at a predetermined interval. In general, as the arrangement period $\Lambda$ of the metal wire 25b is longer than the wavelength of the incident light, the wire-grid polarizer has more of a characteristic as a diffraction grid. Also, as the arrangement period $\Lambda$ of the metal wire 25b is shorter than the wavelength of the incident light, the wire-grid polarizer has more of a characteristic as a polarizer. When the wire-grid polarizer has a characteristic as a polarizer, the wire-grid polarizer reflects the light having a polarization direction parallel to the metal wire 25b and transmits light of a polarization direction perpendicular to the metal wire 25b. For example, when the metal wire 25b is appropriately arranged, an S-polarization light having a polarization direction parallel to an incident plane is reflected by the wire-grid polarizer and a P-polarization light having a polarization direction perpendicular to the incident plane can pass through the wire-grid polarizer. As the arrangement period $\Lambda$ of the metal wire 25b decreases, the polarization extinction ratio increases by geometric progression.

Figure 5:
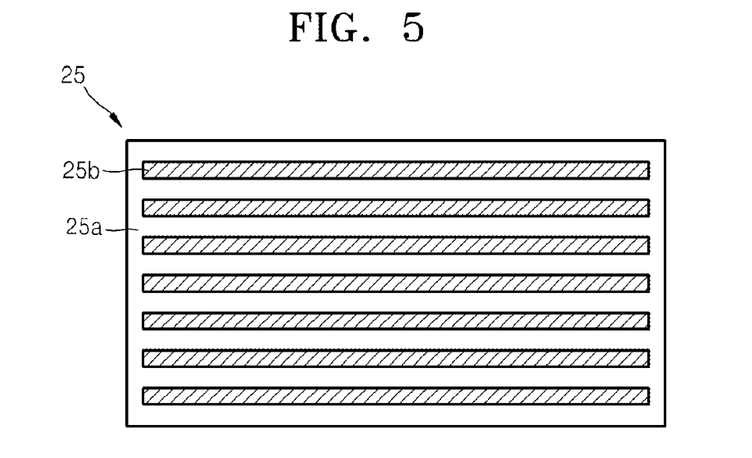
FIG. 5 schematically illustrates the plan view of the reflective polarizer used for the stereo image display apparatus of FIGS. 3A and 3B.

Thus, according to the present exemplary embodiment shown in FIGS. 3A and 3B, a wire-grid polarizer in which the metal wires 25b are arranged in the same direction over the overall area of the transparent substrate 25a can be used as the reflective polarizer 25, as shown in FIG. 5. In this case, the reflection polarizer 25 can provide very quality polarization light to the display panel 27.

According to the present exemplary embodiment, the light passing through the polarization switch 23 and the birefringent element array 24 having the above structure can have one of the following polarization directions according to the state of the polarization switch 23. That is, (i) the light passing through the first birefringent element 24a passes through the reflective polarizer 25 and the light passing through the second birefringent element 24b is reflected by the reflective polarizer 25, (ii) the light passing through the first birefringent element 24a is reflected by the reflective polarizer 25 and the light passing through the second birefringent element 24b passes through the reflective polarizer 25, and (iii) the light passing through both of the first and second birefringent elements 24a and 24b partially passes through the reflective polarizer 25.

The lens array 26 is formed by arranging a plurality of vertical lenticular lens elements in a horizontal direction. Each of the lenticular lens elements is formed in the vertical direction of the image display apparatus 20 parallel to the birefringent elements 24a and 24b of the birefringent element array 24. The lens array 26 separates the incident light into the left eye view zone and the right eye view zone. The light passing through the lens array 26 forms an image by being separated in the left eye view zone and the right eye view zone at a viewing distance. For example, the light emitted from the first birefringent element 24a proceeds toward the right eye view zone through the lens array 26 and the light emitted from the second birefringent element 24b proceeds toward the left eye view zone through the lens array 26.

As it is well known, the interval between the left eye view zone and the right eye view zone at the viewing distance may be about 65 mm. For this purpose, the pitch between the lenticular lens elements of the lens array 26 is the same as, or slightly smaller than, that between the first and second birefringent elements 24a and 24b of the birefringent element array 24. That is, the width of a single lenticular lens element is the same as, or slightly smaller than, sum of the width of the first birefringent element 24a and the width of the second birefringent element 24b. Also, the distance between the lens array 26 and the birefringent element array 24 may be the same as, or slightly greater than, the focal length of the lenticular lens element.

The operation of a highly efficient 2D/3D switchable display apparatus 20 configured as above according to the present invention will be described in detail with reference to FIGS. 3A and 3B.

For the convenience of explanation, it is assumed that the polarization panel 22 is a DBEF that transmits a P-polarization light indicated by "●" in the drawing and reflects the S-polarization light indicated by "↔" in the drawing and that the polarization switch 23 is a liquid crystal retarder that has a first state in which the polarization direction of the incident light is not changed, a second state in which the polarization direction of the incident light is changed by 45° or delayed by ¼ wavelength ($\lambda/4$), and a third state in which the polarization direction of the incident light is changed by 90° or delayed by ½ wavelength ($\lambda/2$). Also, it is assumed that the first birefringent element 24a is a retarder that delays phase by half wavelength ($\lambda/2$) and the second birefringent element 24b is a retarder that does not delay phase. Also, it is assumed that the reflective polarizer 25 is a wire-grid polarizer that transmits the P-polarization light and reflects the S-polarization light.

First, the backlight unit 21 emits an unpolarized light. The P-polarization light of the light emitted from the backlight unit 21 passes through the polarization panel 22 and is incident on the polarization switch 23. The S-polarization light is reflected by the polarization panel 22 and then by the reflection panel 28 at the bottom of the backlight unit 21 so as to be reused. Although it is not shown, the backlight unit 21 includes a diffusion panel to uniformly emit light. The S-polarization light reflected by the reflection panel 28 is diffused by the diffusion panel and can be changed to the unpolarized light.

As shown in FIG. 3A, when the polarization switch 23 is in the first state, the polarization direction of the light passing through the polarization panel 22 and incident on the polarization switch 23 is not changed. Thus, the light passing through the polarization switch 23 is still the P-polarization light. Then, the P-polarization light passes through each of the first and second birefringent elements 24a and 24b. As shown in FIG. 3A, the light passing through the first birefringent element 24a is delayed by the half wavelength ($\lambda/2$) and changed to the S-polarization. However, since the phase of the light passing through the second birefringent element 24b is not changed, the light maintains the S-polarization. Then, the light passing through each of the first and second birefringent elements 24a and 24b is incident on the reflective polarizer 25. Since the light passing through the first birefringent element 24a is the S-polarization light, the light is reflected by the reflective polarizer 25 and incident on the first birefringent element 24a. The reflected light is changed to the P-polarization by the first birefringent element 24a and reflected by the reflection panel 28 of the backlight unit 21 so as to be reused.

On the other hand, since the light passing through the second birefringent element 24b is the P-polarization light, the light passes through the reflective polarizer 25 and incident on the lens array 26. Then, the light proceeds toward the left eye view zone by the lens array 26. Thus, in this case, when the display panel 27 displays the left eye image, the user recognizes only the left eye image through his/her left eye.

As shown in FIG. 3B, when the polarization switch 23 is in the third state, the P-polarization light passing through the polarization panel 22 and incident on the polarization switch 23 is changed to the S-polarization light as the polarization direction changes. Then, the S-polarization light passes through each of the first and second birefringent elements 24a and 24b. As shown in FIG. 3B, the phase of the light passing through the first birefringent element 24a is delayed by half wavelength ($\lambda/2$) so that the light is changed to the P-polarization. However, the phase of the light passing through the second birefringent element 24b is not changed so that the light remains unchanged as the S-polarization light. Then, the light passing through each of the first and second birefringent elements 24a and 24b is incident on the reflective polarizer 25. Since the light passing through the second birefringent element 24b is the S-polarization light, the light is reflected by the reflective polarizer 25 and passes again through the second birefringent element 24b. The reflected S-polarization light is changed again to the P-polarization by the polarization switch 23 and reflected by the reflection panel 28 of the backlight unit 21 so as to be reused. On the other hand, since the light passing through the first birefringent element 24a is the P-polarization light, the light passes through the reflective polarizer 25 and incident on the lens array 26. Then, the light proceeds toward the right eye view zone by the lens array 26. Thus, in this case, when the display panel 27 displays the right eye image, the user recognizes only the right eye image through his/her right eye.

According to the above-described principle, in the 3D mode, when the display panel 27 displays the left eye image and the right eye image, the polarization switch 23 is respectively switched to the first state and the third state so that the user can view a stereo image. The display panel 27 needs to display the right eye image and the left eye image at a very fast time interval so that the user cannot sense flickering. Thus, as described above, a high response speed LCD having a refresh rate of about 120 Hz or higher may be used as the display panel 27. Also the polarization switch 23 needs to be switched very fast in synchronism with the display panel 27. Thus, a liquid crystal retarder that is electrically controllable may be used as the polarization switch 23. Presently, a liquid crystal retarder having a switching speed of about 180 Hz is provided at a relatively low price.

In the meantime, the 2D mode can be embodied in two methods. For example, while the polarization switch 23 is repeatedly switched between the first and third states, the display panel 27 continuously displays the same image by two frames. Then, since the same image is continuously recognized by the right eye and the left eye of the user, the user can view a 2D image.

In another method, while the polarization switch 23 is fixed to the second state, the display panel 27 displays a 2D image at a typical speed of about 60 Hz. When the polarization switch 23 is in the second state, the light passing through the polarization switch 23 has both P-polarization component and S-polarization component. The light passing through each of the first and second birefringent elements 24a and 24b has both P-polarization component and S-polarization component. Of the light passing through the first and second birefringent elements 24a and 24b, the light having a P-polarization component passes through the reflective polarizer 25 and incident on the lens array 26. Then, the P-polarization light incident on the lens array 26 from the first birefringent element 24a passes through the display panel 27 and proceeds toward the right eye view zone. The P-polarization light incident on the lens array 26 from the second birefringent element 24b passes through the display panel 27 and proceeds toward the left eye view zone. Thus, when the display panel 27 displays a 2D image, the user can view the 2D image through his/her left and right eyes.

Figure 6A:
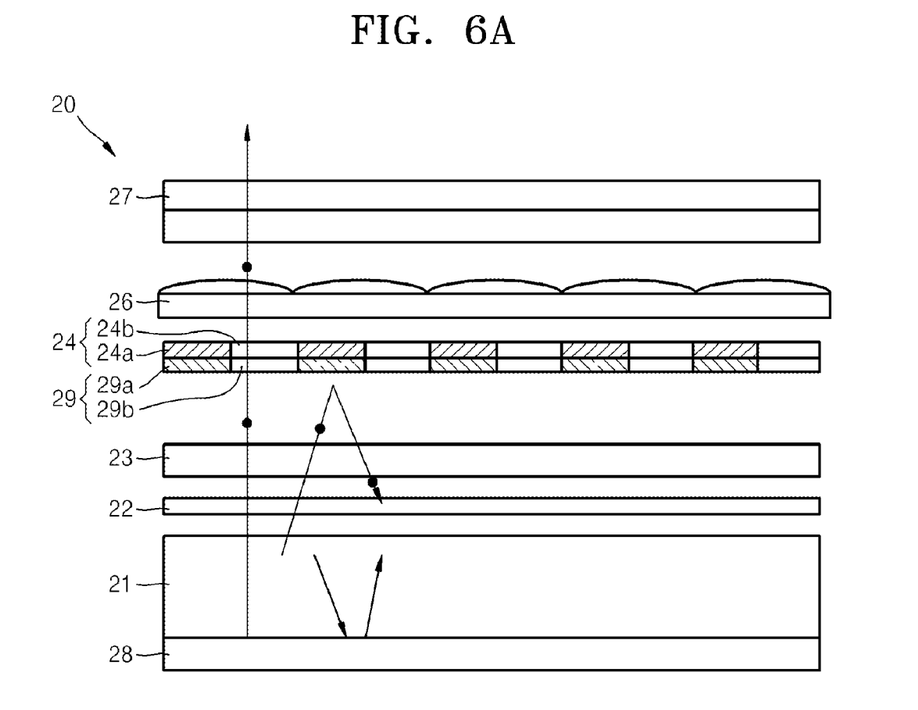
FIGS. 6A and 6B schematically illustrate the structure and operation of a stereo image display apparatus having an improved light use efficiency according to another embodiment of the present invention.
Figure 6B:
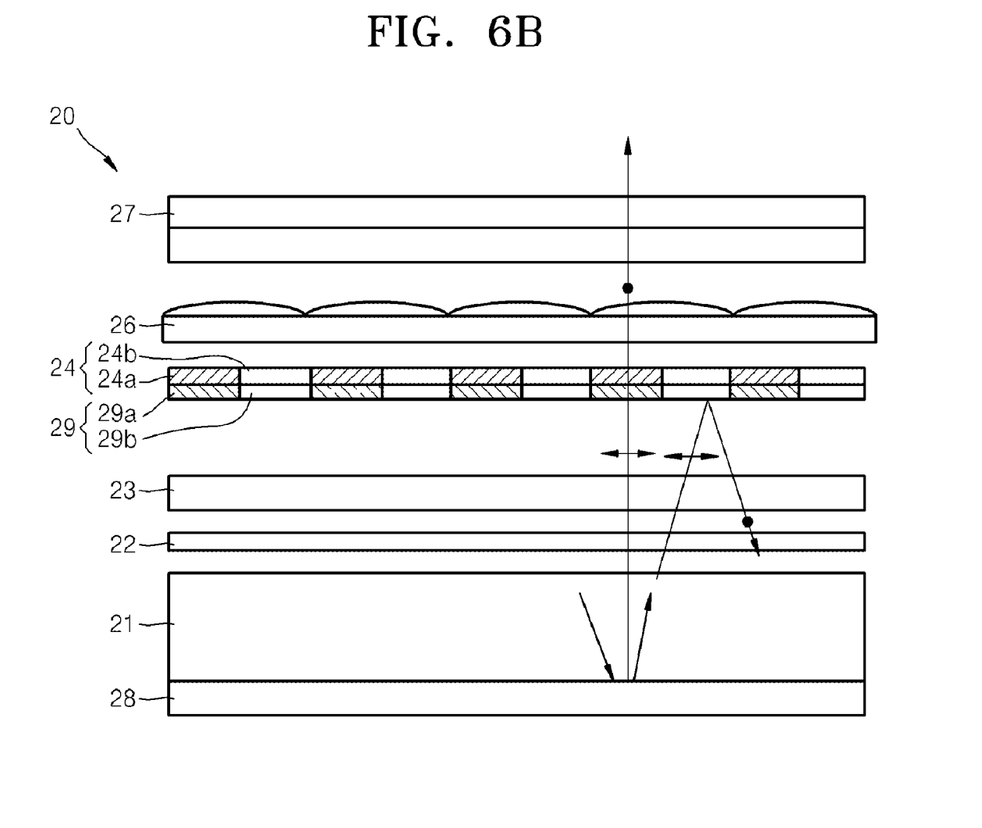
Figure 7:
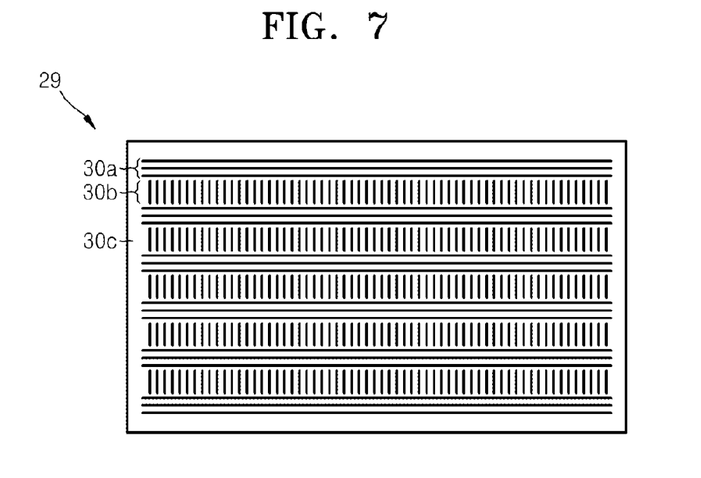
FIG. 7 schematically illustrates the plan view of a reflective polarizer array used for the stereo image display apparatus of FIGS. 6A and 6B.

FIGS. 6A and 6B schematically illustrate the structure and operation of a stereo image display apparatus having an improved light use efficiency according to another exemplary embodiment of the present invention. Compared to the image display apparatus 20 of FIGS. 3A and 3B where the reflective polarizer 25 is arranged between the lens array 26 and the birefringent element array 24, an image display apparatus 20' according to the present exemplary embodiment is different in that the reflective polarizer array 29 is arranged between the birefringent device array 24 and the polarization switch 23. The reflective polarizer array 29 has a structure in which first and second reflective polarizers 29a and 29b different from each other are alternately arranged. For example, the first reflective polarizer 29a is a wire-grid polarizer that transmits S-polarization light and reflects P-polarization light. The second reflective polarizer 29b is a wire-grid polarizer that transmits the P-polarization light and reflects S-polarization light. FIG. 7 schematically illustrates the plain view of the reflective polarizer array 29. As shown in FIG. 7, the reflective polarizer array 29 can be formed by periodically arranging metal wires 30a and 30b arranged perpendicular to each other on a transparent substrate 30c.

Also, the first and second reflective polarizer 29a and 29b of the reflective polarizer array 29 are respectively arranged to correspond to the first and second birefringent elements 24a and 24b of the birefringent element array 24. That is, the first reflective polarizer 29a corresponds to the first birefringent element 24a and the second reflection polarization panel 29b corresponds to the second birefringent element 24b. Thus, the widths of the first and second reflective polarizer 29a and 29b of the reflective polarizer array 29 match the widths of the first and second birefringent elements 24a and 24b of the birefringent element array 24.

In this structure, as shown in FIG. 6A, when the polarization switch 23 is in the first state, the P-polarization light passing through the polarization switch 23 is incident on each of the first and second reflective polarizer 29a and 29b. As shown in FIG. 6A, the P-polarization light incident on the first reflective polarizer 29a is reflected by the first reflective polarizer 29a and then reflected by the reflection panel 28 of the backlight unit 21 so as to be reused. On the other hand, the P-polarization light incident on the second reflective polarizer 29b passes through the second reflection polarization panel 29b and incident on the second birefringent element 24b. Then, the P-polarization light passes through the second birefringent element 24b without a change in the polarization direction and proceeds toward the left eye view zone by means of the lens array 26.

Also, as shown in FIG. 6B, when the polarization switch 23 is in the third state, the polarization direction of the P-polarization light incident on the polarization switch 23 is changed to the S-polarization light. The S-polarization light is incident on each of the first and second reflective polarizers 29a and 29b. As shown in FIG. 6B, the S-polarization light incident on the first reflective polarizer 29a passes through the first reflective polarizer 29a and incident on the first birefringent element 24a. The light is changed to the P-polarization light by the first birefringent element 24a and proceeds toward the right eye view zone by means of the lens array 26. On the other hand, the S-polarization light incident on the second reflective polarizer 29b is reflected by the second reflective polarizer 29b and incident on the polarization switch 23. Then, the light is changed to the P-polarization light by the polarization switch 23 and reflected by the reflection panel 28 of the backlight unit 21 so as to be reused.

As a result, in the 3D mode, when the display panel 27 displays the left eye image, the polarization switch 23 is switched to the first state. When the display panel 27 displays the right eye image, the polarization switch 23 is switched to the third state. Thus, the user can view a stereo image.

Figure 8:
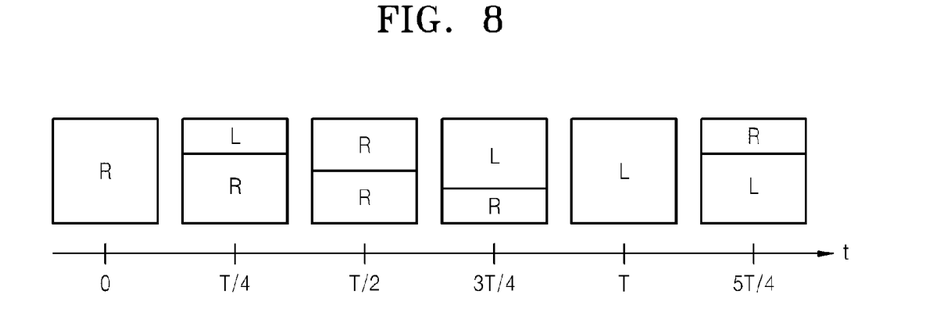
FIG. 8 illustrates the process of scanning images for the left and right eyes in a display panel according to the passage of time.

In the meantime, the display panel 27 does not display the right eye image at once and then the left eye image, but sequentially scans continuous images from the top to bottom of a screen, as shown in FIG. 8. As a result, the time when the left eye image and the right eye image share a single screen exists so that crosstalk detected as the left eye image and the right eye image are mixed can occur.

Thus, to prevent crosstalk, the polarization switch 23 according to the present exemplary embodiment can be divided into a plurality of horizontal segments that are sequentially switched in synchronism with the vertical scanning time of the display panel 27. The respective horizontal segments of the polarization switch 23 may be independently switched and arranged in the vertical direction. In this case, each of the horizontal segments of the polarization switch 23 is switched to the first state when corresponding pixel lines of the display panel 27 display an image of a frame and then to the third state when an image of the next frame is displayed.

Figure 9:
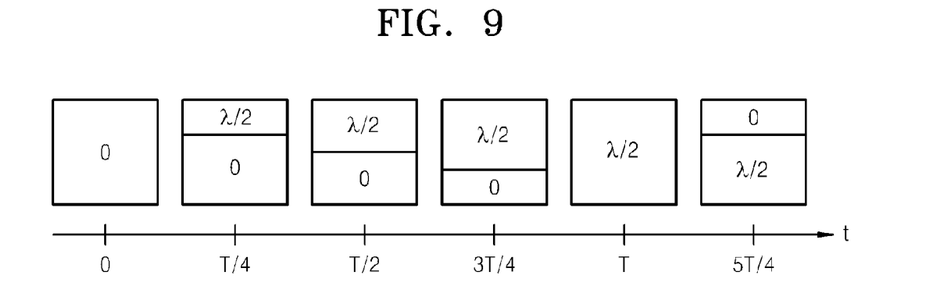
FIG. 9 illustrates an example of a switching operation of a polarization switch in the display panel.

FIG. 9 illustrates an example of a switching operation of a polarization switch in the display panel. In FIG. 9, the polarization switch 23 is a four-divided polarization switch 23 divided into four segments that does not delay the incident light in the first state and delays the incident light by ½ wavelength (λ/2) in the third state. As shown in FIG. 9, the polarization switch 23 is in the first state at time "0" and in the third state at time "T". The polarization switch 23 is continuously changed from the first state to the third state in synchronism with the display panel 27 between the time "0" and "T". The switching operation of the polarization switch 23 is controlled to be accurately synchronized with the time that the display panel 27 displays an image. As a result, during the time when the left eye image and the right eye image share a screen, crosstalk hardly occurs and the left eye image and the right eye image can be accurately separated.

As described above, according to the present invention, when a stereo image is produced, the reduction of resolution and brightness can be prevented. That is, since the display panel alternately displays the left eye image and the right eye image at high speed, the reduction of resolution can be prevented. Also, as the light is reused using the reflective polarizer, a light use efficiency is improved so that brightness can be improved compared to the conventional technology. Furthermore, according to the present invention, a general 2D image can be displayed in a 2D mode or a stereo image can be displayed in a 3D mode, as necessary.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An image display apparatus comprising:
a backlight unit where a reflection panel is installed at a bottom thereof;
a polarization panel which transmits only light of a particular polarization direction of light emitted from the backlight unit;
a polarization switch which changes polarization direction of light incident upon the polarization switch;
a birefringent element array which is formed by alternately arranging a plurality of first and second birefringent elements and changes polarization direction of light incident upon the first and second birefringent elements respectively to make polarization directions of light passing through the first and second birefringent elements perpendicular to each other;
a reflection polarizer panel which transmits only light of a particular polarization direction of light passing through the birefringent element array and reflects light of the other polarization direction of the light passing through the birefringent element array;
a lens array which separates light incident upon the lens array into a first view zone and a second view zone; and
a display panel which displays an image.

2. The image display apparatus of claim 1, wherein the polarization switch is switched among first through third states in which the polarization direction of the light incident upon the polarization switch is changed differently.

3. The image display apparatus of claim 2, wherein the polarization switch is switched among a first state in which the polarization direction of the light incident upon the polarization switch is not changed, a second state in which the polarization direction of the light incident upon the polarization switch is changed by 45°, and a third state in which the polarization direction of the light incident upon the polarization switch is changed by 90°.

4. The image display apparatus of claim 1, wherein the birefringent element array is formed by alternately arranging in a horizontal direction the first and second birefringent elements that are vertical.

5. The image display apparatus of claim 4, wherein each of the first and second birefringent elements is formed of a retarder that delays incident light by a phase and a phase delay difference between a retarder forming the first birefringent element and a retarder forming the second birefringent element is $\lambda/2$.

6. The image display apparatus of claim 4, wherein each of the first and second birefringent elements is formed of a rotator that rotates incident light by an angle and a rotation angle difference between a rotator forming the first birefringent element and a rotator forming the second birefringent element is 90°.

7. The image display apparatus of claim 4, wherein the lens array is formed by arranging a plurality of lenticular lens element that are vertical, and parallel to the plurality of the first and the second birefringent elements of the birefringent element array in a horizontal direction.

8. The image display apparatus of claim 1, wherein the reflective polarizer is a wire-grid polarizer formed of metal wires arranged parallel to one another at a constant interval.

9. The image display apparatus of claim 1, wherein the polarization panel transmits only light of a particular polarization direction of the light emitted from the backlight unit and reflects light of the other polarization direction of the light emitted from the backlight unit.

10. The image display apparatus of claim 1, wherein the polarization switch is divided into a plurality of horizontal segments that are sequentially switched in synchronism with a vertical scanning time of the display panel.

11. An image display apparatus comprising:
a backlight unit where a reflection panel is installed at a bottom thereof;
a polarization panel which transmits only light of a particular polarization direction of light emitted from the backlight unit;
a polarization switch which changes the polarization direction of light incident upon the polarization switch;
a reflective polarizer panel array which is formed by alternately arranging a first reflective polarizer panel that reflects light of a first polarization direction of light incident upon the first reflective polarizer panel and transmits light of a second polarization direction of light incident upon the first reflective polarizer panel and a second reflective polarizer panel that transmits light of a first polarization of light incident upon the second reflective polarizer panel and reflects light of a second polarization of light incident upon the second reflective polarizer panel;
a birefringent element array which is formed by alternately arranging a plurality of first and second birefringent elements and changes polarization direction of light incident upon the plurality of first and second birefringent elements to make polarization directions of light passing through the first and second birefringent elements perpendicular to each other;
a lens array which separates light incident upon the lens array into a first view zone and a second view zone; and
a display panel displaying an image.

12. The image display apparatus of claim 11, wherein the polarization switch is switched among first through third states in which the polarization direction of the light incident upon the polarization switch is changed differently.

13. The image display apparatus of claim 12, wherein the polarization switch is switched among a first state in which the polarization direction of the light incident upon the polarization switch is not changed, a second state in which the polarization direction of the light incident upon the polarization switch is changed by 45°, and a third state in which the polarization direction of the light incident upon the polarization switch is changed by 90°.

14. The image display apparatus of claim 11, wherein the birefringent element array is formed by alternately arranging in a horizontal direction the first and second birefringent elements that are vertical.

15. The image display apparatus of claim 14, wherein each of the first and second birefringent elements is formed of a retarder that delays incident light by a phase and a phase delay difference between a retarder forming the first birefringent element and a retarder forming the second birefringent element is $\lambda/2$.

16. The image display apparatus of claim 14, wherein each of the first and second birefringent elements is formed of a rotator that rotates incident light by an angle and a rotation angle difference between a rotator forming the first birefringent element and a rotator forming the second birefringent element is 90°.

17. The image display apparatus of claim 14, wherein the lens array is formed by arranging a plurality of lenticular lens elements that are vertical, and parallel to birefringent elements of the birefringent element array in a horizontal direction.

18. The image display apparatus of claim 14, wherein the first and second reflective polarizers of the reflective polarizer array are respectively arranged to face the first and second birefringent elements of the birefringent element array.

19. The image display apparatus of claim 18, wherein the first and second reflective polarizers panels are wire-grid polarizers formed of metal wires arranged parallel to one another at a constant interval, and the metal wire of the first reflective polarizer and the metal wire of the second reflective polarizer are arranged perpendicular to each other.

20. The image display apparatus of claim 11, wherein the polarization panel transmits only light of a particular polarization direction of the light emitted from the backlight unit and reflects light of the other polarization direction of the light emitted from the backlight unit.

21. The image display apparatus of claim 11, wherein the polarization switch is divided into a plurality of horizontal segments that are sequentially switched in synchronism with a vertical scanning time of the display panel.

* * * * *